US008982942B2

(12) United States Patent
Gao et al.

(10) Patent No.: US 8,982,942 B2
(45) Date of Patent: Mar. 17, 2015

(54) ADAPTIVE CODEC SELECTION

(75) Inventors: Wenfeng Gao, Bellevue, WA (US); Shyam Sadhwani, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 625 days.

(21) Appl. No.: 13/163,632

(22) Filed: Jun. 17, 2011

(65) Prior Publication Data

US 2012/0320967 A1  Dec. 20, 2012

(51) Int. Cl.
*H04N 7/26* (2006.01)
*G10L 25/69* (2013.01)
*H04N 21/2365* (2011.01)
*H04N 21/238* (2011.01)
*H04W 28/18* (2009.01)

(52) U.S. Cl.
CPC ............ *G10L 25/69* (2013.01); *H04N 21/2365* (2013.01); *H04N 21/238* (2013.01); *H04W 28/18* (2013.01)
USPC ...... 375/240; 375/240.03; 370/252; 370/254; 704/221; 710/116

(58) Field of Classification Search
CPC ....................................................... H04N 7/26
USPC .................................................. 375/240.02
See application file for complete search history.

(56) References Cited

U.S. PATENT DOCUMENTS 5,436,900 A * 7/1995 Hammar et al. ............... 370/336
5,838,996 A   11/1998 deCarmo
6,574,279 B1 * 6/2003 Vetro et al. ................ 375/240.23
6,731,734 B1   5/2004 Shaffer
7,002,992 B1   2/2006 Shaffer
7,092,875 B2 * 8/2006 Tsuchinaga et al. .......... 704/210
7,111,098 B2 * 9/2006 Sumihiro ....................... 710/116
7,567,897 B2   7/2009 Halcrow
7,647,203 B1 * 1/2010 Herz ............................. 702/182

(Continued)

OTHER PUBLICATIONS

Raut et al., "Application specific optimal codec in cognitive environment," *2010 International Journal of Computer Applications* (0975-8887), vol. 1, No. 24, pp. 42-48.

(Continued)

*Primary Examiner* — William C Vaughn, Jr.
*Assistant Examiner* — Luis M Perez
(74) *Attorney, Agent, or Firm* — Bryan Webster; Kate Drakos; Micky Minhas

(57) ABSTRACT

Disclosed herein are tools and techniques for storing and using video processing tool configuration information that can identify combinations of video processing tools to be used for processing video. In one exemplary embodiment, video processing tools of a computing system are identified. The performance of a combination of the video processing tools is measured. The performance measurement is compared with another performance measurement of another combination of the video processing tools. Based on the comparison, video processing tool configuration information is set. In another exemplary embodiment, video processing tool configuration information indicating a combination of video processing tools is accessed, and video data is processed using the combination of video processing tools based on the video processing tool configuration information.

22 Claims, 12 Drawing Sheets

(56) References Cited

U.S. PATENT DOCUMENTS

| | | | |
|---|---|---|---|
| 7,680,754 B2 * | 3/2010 | Hillier | 706/47 |
| 7,768,998 B1 | 8/2010 | Everson | |
| 7,986,634 B2 * | 7/2011 | Kang et al. | 370/252 |
| 8,036,265 B1 * | 10/2011 | Reynolds et al. | 375/240.01 |
| 8,098,732 B2 * | 1/2012 | Robertson | 375/240.16 |
| 8,117,029 B2 * | 2/2012 | Kim et al. | 704/221 |
| 8,284,205 B2 * | 10/2012 | Miller et al. | 345/502 |
| 8,660,178 B2 * | 2/2014 | Berbecel et al. | 375/240.03 |

OTHER PUBLICATIONS

Sarwar, "Real time multiple codecs switching architecture for video conferencing," <http://eprints.usm.my/10418/1/REAL_TIME_MULTIPLE_CODECS_SWITCHING_ARCHITECTURE_FOR_VIDEO_CONFERENCING.pdf>, 36 pages (2008).

Kim et al., "Efficient hardware-software co-implementation of H.263 video codec," <http://ieeexplore.ieee.org/stamp/stamp.jsp?tp=&arnumber=826398>, 6 pages (1999).

* cited by examiner

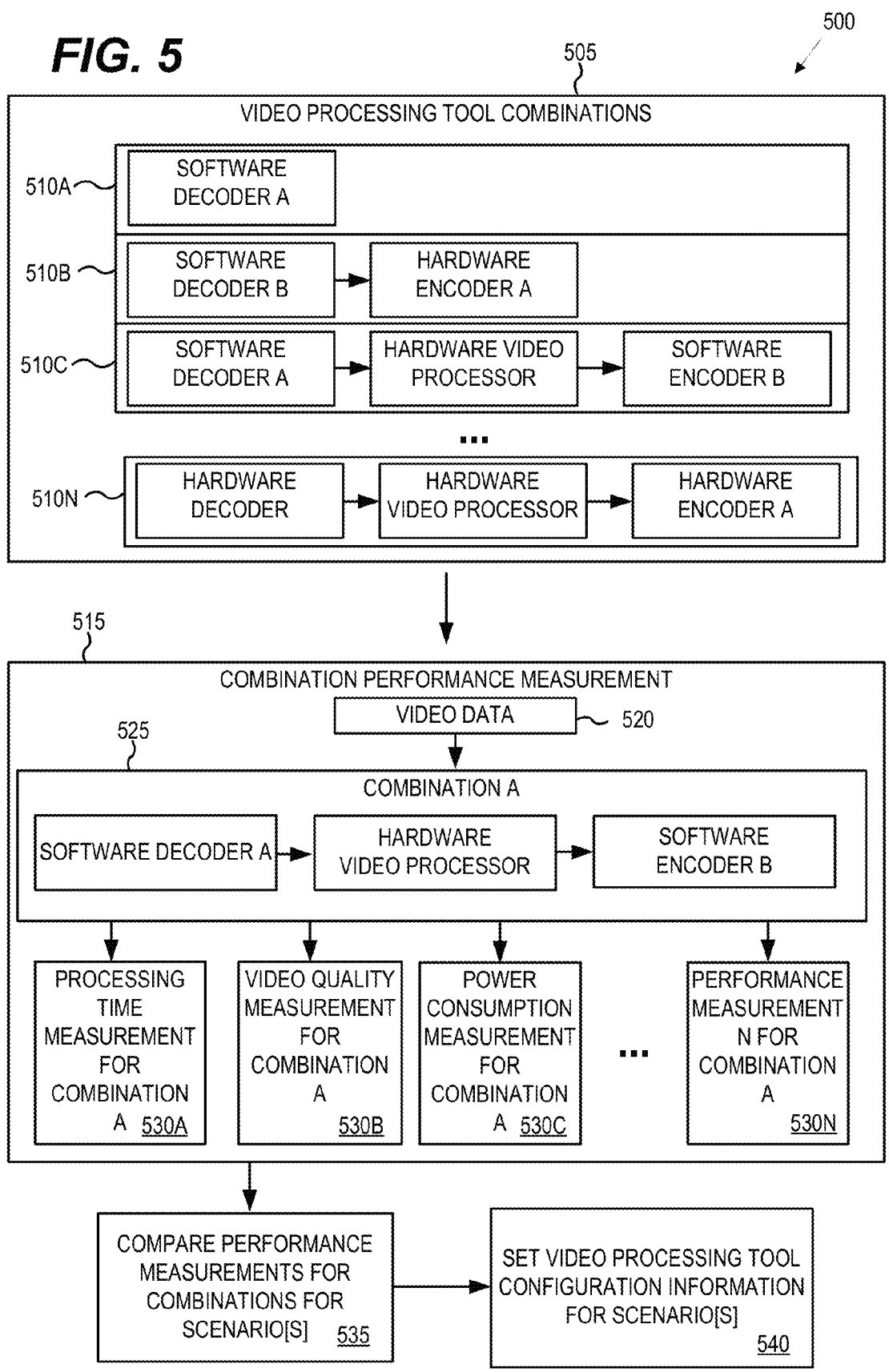

ADAPTIVE CODEC SELECTION

BACKGROUND

Due to the increasing popularity of digital video and its availability for playback on computing devices, various hardware and software video encoders and decoders (generally, codecs) have been developed. The variety of available video codecs can perform at different performance levels—some codecs perform better than others in particular circumstances. In some cases, video codecs can perform differently on different computing systems due to factors such as the system setup, the quality or complexity of the video being processed, or the resources of the system. Due to the increased availability of video codecs, a computing system can have multiple video codecs available for video processing. For example, a computing system can have both software and hardware decoders (and/or encoders) that can provide a desired processing of video data. Although such computing systems can have multiple video codecs available to process video data, such computing system can have limited performance due to the variability of video codec performance.

SUMMARY

Among other innovations, the Detailed Description presents techniques and tools for setting and using media processing tool configuration information that identifies media processing tools to be used for processing media for various scenarios. For example, the media is video.

According to one aspect of the techniques and tools described herein, video processing tools of a computing system are identified. For example, the video processing tools include multiple alternative video decoder implementations for a first video format (such as a hardware decoder and software decoder for decoding from the first video format), multiple alternative video conversion processing implementations (such as a hardware conversion processor and software conversion processor for scaling, de-interlacing, color conversion, etc.), and/or multiple alternative video encoder implementations for a second video format (such as a hardware encoder and software encoder for encoding to the second video format, which may be the same as or different from the first video format). Performance of combinations of the identified video processing tools is measured, and performance measurements are compared. For example, the video processing times of the combinations are measured and compared. Then, based at least in part on the comparison, video processing tool configuration information is set. For example, configuration information identifying a suitable combination of video processing tools can be set. In addition to processing time, factors such as rate-distortion performance (in terms of quality and/or bitrate after encoding or transcoding) and power consumption can be considered in setting the configuration information.

According to another aspect of the techniques and tools described herein, video processing tool configuration information indicating a combination of video processing tools is accessed. Based at least in part on the configuration information, video data is processed using the combination of video processing tools indicated in the configuration information. The configuration information can indicate multiple combinations of video processing tools, and different combinations can be selected for different scenarios. For example, based at least in part on video quality of video data, a combination is selected from multiple available combinations that are adapted for different video qualities. As another example, based at least in part on use case such as decoding, encoding or transcoding, a combination is selected from multiple available combinations that are adapted for different use cases. Or, based at least in part on a power resource, a combination is selected from multiple available combinations that are adapted for different patterns of power consumption. As another example, based at least in part on expected utilization of a central processing unit (CPU), a combination is selected from multiple available combinations that are adapted for different patterns of CPU utilization.

This Summary is provided to introduce a selection of concepts in a simplified form that are further described below in the Detailed Description, which proceeds with reference to the accompanying figures. This Summary is not intended to identify key features or essential features of the claimed subject matter, nor is it intended to be used to limit the scope of the claimed subject matter.

The foregoing and other features and advantages of the disclosure will become more apparent from the following Detailed Description, which proceeds with reference to the accompanying figures.

BRIEF DESCRIPTION OF THE DRAWINGS

FIG. 5 is a schematic diagram showing and exemplary system for setting video processing tool configuration information.

DETAILED DESCRIPTION

Figure 1:
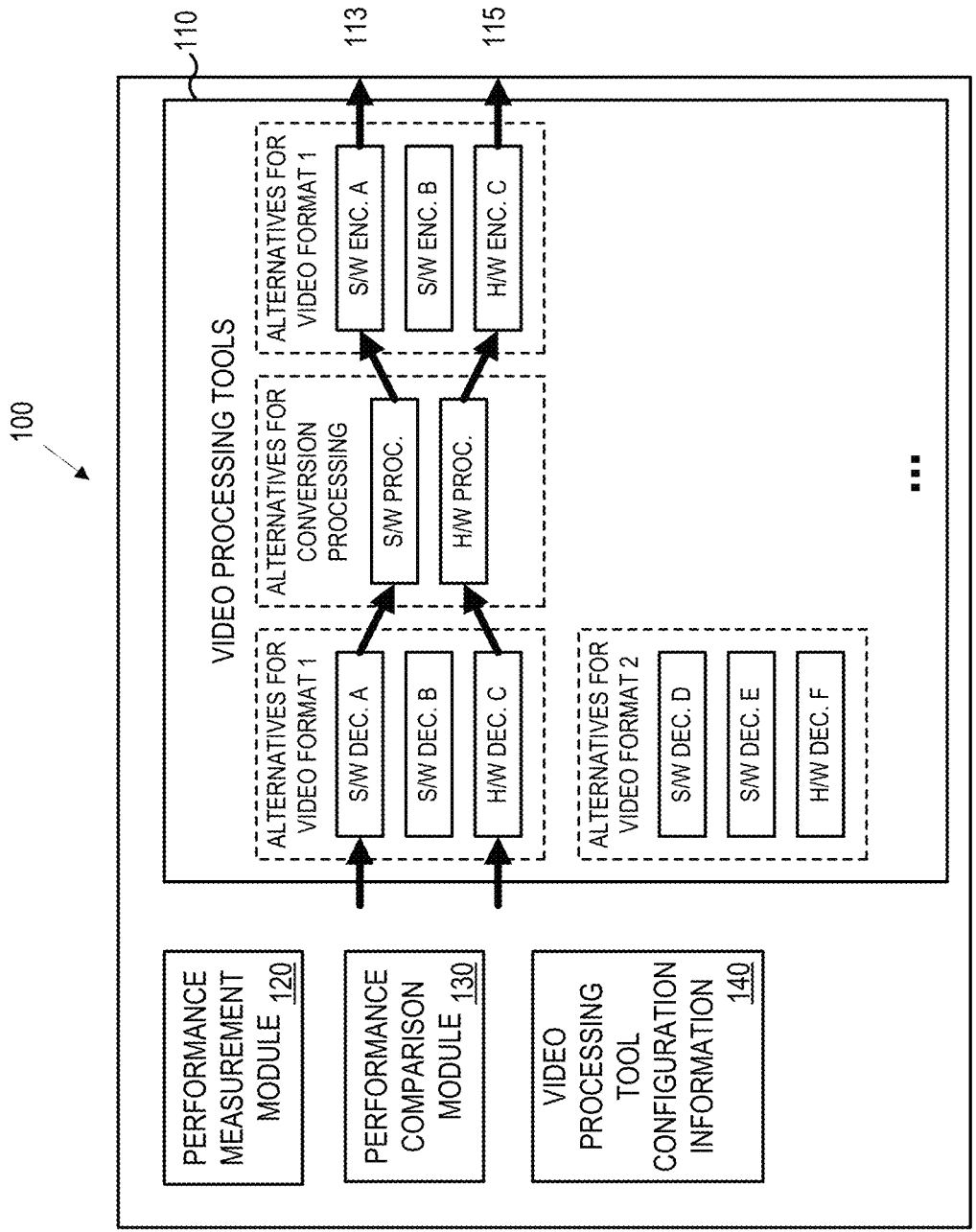
FIG. 1 is a schematic diagram of an exemplary system for storing video processing tool configuration information.

FIG. 1 is a schematic diagram of an exemplary system 100 for storing video processing tool configuration information. In the example, the system 100 includes video processing tools 110 which can be used together as video processing tool combinations (such as combinations 113, 115) to process digital video (e.g., for playback or transcoding). The video processing tools include hardware and software video processing tools (e.g., hardware and software decoders, encoders and/or specialized processors for video). In the past, hardware encoders, hardware decoders and other hardware video processing tools have often outperformed (e.g., processed video faster than) corresponding software processing on processors. However, as processors have become more powerful (e.g., having multiple cores capable of processing multiple threads), software decoder, software encoders and other software video processing tools running on computers with these powerful processors can outperform hardware implementations.

The system 100 includes multiple alternative implementations for decoding video in a first video format and multiple alternative implementations for decoding video in a second video format. A video format can be a VC-1 format, H.264 format or other video format. For a given video format, any of the multiple alternative implementations for the format can be used to decode encoded video data in a conformant way. For example, for the first video format, software decoder A, software decoder B and hardware decoder C provide alternative ways to decode video from the first format. Similarly, software decoder D, software decoder E and hardware decoder F provide alternative ways to decode video from the second format. A software decoder can use only CPU(s) of the computing system in its implementation of decoding. Or, a software decoder can use a combination of CPU(s) and graphics processing units (GPUs) in its implementation of decoding. In FIG. 1, the system 100 also includes multiple alternative implementations for specialized video conversion processing (including a hardware processor and software processor) as well as multiple alternative implementations for encoding video in the first video format (including two software encoders and a hardware encoder). A given software encoder can use only CPU(s) of the computing system in its implementation of encoding, or it can use a combination of CPU(s) and GPU(s) in its implementation of encoding. The system 100 can include decoders and/or encoders for more video formats or fewer video formats, and it need not include the same number of alternative implementations for all formats. The system 100 can omit decoder implementations, encoder implementations, and/or conversion processing implementations, depending on how the system will be used.

The system 100 includes a performance measurement module 120 for measuring the performance (e.g., processing time) of video processing tool combinations (such as combinations 113, 115) when digital video is processed. For example, for a computer that has both hardware and software video processing tools, performance of the respective combinations of the processing tools is measured while video is processed. The performance measurements of the processing tool combinations are compared by the performance comparison module 130. For example, the performance measurements of the processing tool combinations can be compared and suitable combinations for various scenarios are determined by the performance comparison module 130. Video processing tool configuration information 140 is stored in a data store to indicate what combination of the video processing tools is to be used when video is processed by the system 100 under various scenario conditions. For example, the video processing tool configuration information can indicate what combination of video processing tools (e.g., encoder, decoder, and video conversion processor) is to be used for transcoding video from one video format to another, and the configuration information can also indicate what combination of video processing tools is to be used for decoding video from a given video format. Different combinations can be identified in the configuration information depending on expected patterns of power consumption (e.g., system using battery power versus system using DC power), expected patterns of CPU utilization (e.g., CPU busy with other processing versus CPU idle), permutation of video format conversions in transcoding (e.g., VC-1 to H.264, MPEG-2 to H.264, MPEG-2 to VC-1, etc.), and video quality (e.g., high-resolution video versus low-resolution video).

Figure 2:
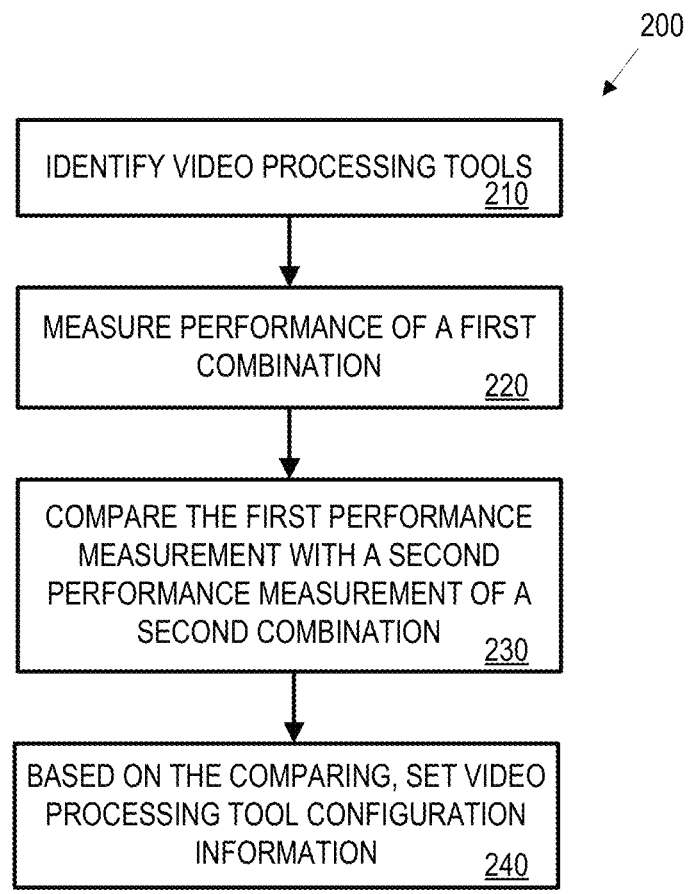
FIG. 2 is a flowchart of an exemplary method for setting video processing tool configuration information.

FIG. 2 is a flowchart of an exemplary method 200 for setting video processing tool configuration information. In the example, video processing tools are identified at block 210. For example, multiple video processing tools available for decoding, encoding and/or other media processing can be identified for enumeration or selection. The identification can be done using information that indicates hardware components or software components, or some other technique. In some implementations, each of the processing tools available to the system can be identified, or only a portion of the available tools can be identified. For example, a first video encoder that meets a quality threshold (e.g., video quality) can be identified for enumeration or selection, while a second video encoder that does not meet the quality threshold is not identified for enumeration or selection. In other implementations, video processing tools can be identified for enumeration or selection based on other factors, such as type of implementation (e.g., hardware or software), a certification, a standard, a performance metric or some other factor.

Different video processing tools can be used for processing video data in both compressed formats and raw data formats, as well as in various resolutions. Video formats can include the VC-1 format, the H.264 format, and other video compression formats. The video data can be in a standard resolution such as so-called standard definition (SD) video or a high resolution such as so-called high definition (HD) video, and the video data can have various frame rates such as 25, 29.97, 30, 59.94 or 60 Hz. Video processing tools can include both software and hardware video processing tools for a given format or stage of processing (e.g., conversion operations). Software video processing tools can include one or more software encoders and/or decoders, or other video processing tools such as software video conversion processors for operations such as scaling, de-interlacing, color conversion and filtering. Software video processing tools can be implemented for execution on one or more processers such as a central processing unit (CPU) and associated memory. Software decoders, encoders, and video conversion processors can be implemented in different software applications or included in a single software application. In some implementations, in addition to processing on a CPU and memory, a software video processing tool can use a specialized processor such as a graphics processing unit (GPU). For example, a software encoder or decoder can have an interface to accelerate video decoding by using a GPU (e.g. DirectX® Video Acceleration). In further implementations, a software video processing tool can have the capability of using or not using a GPU in processing video, and the GPU processing capability can be configured to be turned on or off during video processing. In some implementations, software video processing tools can be processed using multiple threads. For example, multiple threads of a software encoder or decoder can be processed by multiple cores of a multi-core CPU.

The hardware video processing tools can include one or more hardware encoders and/or decoders. A hardware encoder or decoder can include dedicated hardware in a computing system that processes digital video data. Video processing tools can also include one or more hardware video conversion processors. A video conversion processor can be used for specialized processing of video data such as resizing, upsampling, downsampling, de-interlacing, color conversion, adaptive filtering and/or other video processing. A hardware video conversion processor can include dedicated hardware in a computing system that implements the specialized digital video processing. For a hardware encoder, hardware decoder or hardware conversion processor, the dedicated hardware can include one or more special-purpose application-specific integrated circuits (ASICs) for different stages of processing as well as buffers for storing media data. Software executing on one or more CPUs can control overall transfer of data to/from buffers, ASICs or other components of a hardware implementation.

Returning to FIG. 2, at block 220 performance of a first video processing tool combination is measured, yielding a first performance measurement. For example, a combination of one or more of the identified video processing tools can be used to process video data, and the performance of the tool combination can be measured. Video processing tool combinations can be determined as permutations of one or more of the identified video processing tools that address parameters of a given scenario (e.g., use case, video quality, expected power consumption pattern and/or expected CPU utilization). A video processing tool combination can be a combination of tools for producing output video data according to a processing path. Multiple processing tool combinations can process according to different processing paths. The combination for each processing path can include a given one of the permutations of the available video processing tools. For example, a processing path can be a transcoding path or playback path. The transcoding path can include a decoder, optional video processor and encoder used together in a predetermined order to process video. The playback path can include a decoder and optional video processor used together in a predetermined order to process video. Further, the transcoding path or playback path can branch to different combinations depending on other factors such as video quality, expected power consumption pattern and/or expected CPU utilization. The transcoding path can also branch to different combinations depending on permutation of video format conversion in transcoding (e.g., VC-1 to H.264, MPEG-2 to H.264, MPEG-2 to VC-1, etc.).

The video processing tool combinations can be measured for performance using various metrics. A video processing tool combination can be measured for performance before or after each of the video processing tools are identified as part of the combination. For example, a video processing tool combination that includes a single decoder can be measured for performance when the decoder is identified, and then the decoder can be measured together with other video processing tools when the other video processing tools are identified as part of a combination with the decoder. Performance of a video processing tool combination can be measured in terms of rate-distortion performance (quality performance and/or bitrate performance for encoding or transcoding), processing time performance, a power resource performance (power consumption), CPU utilization and/or some other performance metric. For example, the time spent processing video data from start to finish along a processing path can be measured as a processing time performance measurement. A video processing tool combination for playback of video can include a decoder, a video processor, or both. In some implementations of playback of video data, a video or videos in a particular format can be decoded by a decoder. In a further implementation of playback, the decoded video data can be processed by a video processor before display.

In another example, a video processing tool combination can be used for transcoding. In transcoding, input video data in a first video format is converted into output video data in a second video format. For example, a video decoder can decode an input bitstream in VC-1 format to raw video data. The raw video data can be processed by a video processor for color conversion, re-sizing or other scaling, filtering, etc., and then the processed raw data can be encoded into an output bitstream in H.264 format. Transcoding of video data uses a combination of multiple video processing tools. In some implementations transcoding uses one or more decoders, one or more encoders, and one or more video processors. In other transcoding implementations, no video processor is used, and the transcoding is implemented using one or more decoders and encoders. In yet further implementations of video processing tool combinations, the video processing tool combinations can be for other video processing and include various video processing tools.

At block 230 of FIG. 2, the first performance measurement (for the first video processing tool combination) is compared with a second performance measurement for a second video processing tool combination. The first and second video processing tool combinations process video data into a desired output video data—they are alternative combinations—so their performances are compared. For example, a software decoder can playback a video clip, and a hardware decoder can playback the same video clip, and their performances can be compared. In other implementations, more than two performance measurements can be compared. For example, if there are a number of different video processing tool combinations that are measured for performance, that number of measurements can be compared or a subset of the measurements can be compared. Once a comparison or comparisons are made, a video processing tool combination can be set based at least in part on the comparison or comparisons. Comparing the performances allows for determining which combination processes better for a given scenario or which combination is otherwise suitable (e.g., faster, less power consumed, less CPU utilization) for the given scenario. A suitable video processing tool combination can be selected to be stored as the video processing combination to be used when video is processed under the conditions of the scenario.

In general, a scenario is a set of one or more conditions under which video processing occurs. For example, the processing times (e.g., processing speeds) of the combinations can be compared, and the video processing tool combination with the fastest or least processing time can be chosen as the combination for a given use case. For a given scenario, the choice of suitable combination can depend on the types of performance measurements compared. For example, if video quality measurements are compared, then the combination with the better video quality can be determined as the suitable combination. More than one performance measurement can be considered in a comparison. For example, a hardware encoder may be faster than a software encoder, but a software encoder may have better video quality. Or, a software decoder may be faster than a hardware decoder, but the hardware decoder has lower power consumption and lower CPU utilization. These differences in performance measurements can be considered in the comparison of performance measurements. In some implementations, different performance factors are given different weights in the comparison, and in others the factors are not weighted. For other performance measurements or combinations of performance measurements, a suitable combination can be determined according to only those factors relevant for the conditions of the scenarios. Often video processing tools (e.g., software encoders) can be configured for processing according to available options. When the video processing tools are tested or measured for performance, the tool configurations can be set to the default configurations or custom configurations. Permutations of video processing tools with different configurations can be used in different video processing tool combinations and measured for performance.

In comparing performance measurements, a variance between measurements for the compared video processing tool combinations can be determined. A variance can be a difference (e.g., percentage difference) between the performance measurements of different video processing tool combinations. For example, a processing time of a hardware decoder can be compared to a processing time of a software decoder, and a percentage difference between the times can be determined as a variance. A variance can be compared with a variance threshold to choose a suitable video processing tool combination. The variance threshold can be set or configured (e.g., based on a scenario, the processing of the video, or the processing system) to account for various conditions such as different processing loads, computer fluctuations, or other conditions. For example, often hardware decoders outperform software decoders in decoding video data. However, some software decoders can outperform hardware decoders under certain conditions such as when a CPU is idle. Setting a variance threshold can account for conditions that vary from the default conditions tested, such as when the CPU is running more processes and has a larger processing load than during the default combination testing. (Also, even if software processing tools using one or CPUs are faster than corresponding hardware processing tools, the CPU(s) are more likely to be usable for other processing tasks. The variance threshold thus favors the hardware processing tools when performance of corresponding software processing tools is only marginally better.) A determined variance for a video processing tool combination can be compared to a variance threshold, and based on the comparison a video processing tool combination can be chosen. For example, if a software decoder outperforms a (default) hardware decoder by a variance that exceeds a variance threshold (e.g., set at 10%), then the software decoder is selected as the combination to be identified for use for the particular scenario or scenarios by the video processing tool configuration information. However, if the software decoder does not outperform the hardware decoder or outperforms the hardware decoder by a variance that does not exceed the variance threshold, then the hardware decoder is chosen as the combination to be used for the particular scenario or scenarios. In general, when a threshold variance is used, a default combination can be designated to be chosen unless a new combination outperforms the default combination by a variance that exceeds the threshold variance. For example, combinations that include hardware video processing tools can be selected as default combinations. In other implementations, other combinations including other tools such as software video processing tools can be designated as default combinations.

At block 240 of FIG. 2, video processing tool configuration information is set based at least in part on the comparisons of performance measurements. For example, one or more scenarios can be indicated in a data store, and the video processing tool combinations that are chosen for the scenarios are included in the configuration information in the data store. In some implementations, a data store can be a database, a file, a table, or some other repository for data such as the configuration information. The data store can be located where it can be accessed by software applications in a computing system to read video processing tool configuration information. The stored indications of the video processing tool combinations can identify what video processing tools are to be used in combination when video data is processed on the computing system under the conditions of the indicated scenarios, respectively. For example, an identifier of a particular encoder, decoder, and/or video processor can be stored under a registry key (or other identifier) that is designated for a particular scenario. In some implementations, video processing tool configuration information is published if the chosen combination is different from a default video processing tool combination. For example, when hardware video processing tools are available on a system, permutations of the hardware tools can be set as the default video processing tool combinations to be used for video processing on the system. If a video processing tool combination that includes a software processing tool is chosen because it outperforms the default hardware combination under a scenario, then configuration information for the identified video processing tool combination can be stored so that the outperforming combination is used for video processing under the scenario. In other implementations, video processing tool configuration information can be stored or published for each scenario or chosen tool combination.

In some implementations, the process 200 can be done to configure a computing system according to the capabilities of the computing system at a particular time. For example, an original equipment manufacturer can configure computing systems of a particular type by running a tool or tools that perform the method 200, then storing the configuration information for transfer to the respective computing systems of that type. However, a given instance of the computing system can be updated by adding or removing various resources including video processing tools (e.g., new encoders and/or decoders) and related resources. When a computing system is updated, the process 200 can be done again to reconfigure the computing system with video processing information that is determined based on a current state of the computing system. For example, a user of an updated computing system can download a tool or tools to the computing system that can update the configuration information on the computing system by performing the process 200 and storing new video processing tool configuration information for the updated computing system.

Alternatively, the technique 200 shown in FIG. 2 is used to set processing tool configuration information for other media. For example, the technique 200 is used to set audio processing tool configuration information. In this case, audio processing tools are identified. For example, multiple audio processing tools available for decoding, encoding and/or other media processing can be identified for enumeration or selection. The performance of a first audio processing tool combination is measured, yielding a first performance measurement. For example, a combination of one or more of the identified audio processing tools is used to process audio data, and the performance of the tool combination is measured. Combinations can be determined as permutations of one or more of the identified audio processing tools that address parameters of a given scenario (e.g., use case, audio quality, expected power consumption pattern and/or expected CPU utilization). The performance measurements are compared for the different combinations, and audio processing tool configuration information is set based at least in part on the comparisons of performance measurements. For example, one or more scenarios can be indicated in a data store, and the audio processing tool combinations that are chosen for the scenarios are included in the configuration information in the data store.

Figure 3:
FIG. 3 is a schematic diagram of an exemplary data store for storing video processing tool configuration information.

FIG. 3 is a schematic diagram of an exemplary data store 300 for storing video processing tool configuration information. In the example, the configuration information is stored for predetermined scenarios such as indicated scenario 305. A scenario is a set of one or more conditions under which video processing occurs. Scenario conditions can include computer system conditions, video data input and output conditions, video processing conditions, and other conditions under which video processing can occur. For example, system conditions can include power resource conditions, processing resource conditions (e.g., CPU load, number of processes running on a CPU, busy or idle CPU or GPU, or other state of a processing resource), memory resource conditions, processing tool attributes (e.g., certifications or quality standards) or other computing system conditions that can influence the performance of video processing. Video data input and output conditions can include conditions for input and output video data formats, input and output video data resolutions, or other video data conditions that can influence the performance of video processing. For example, a scenario can include the conditions that the input video data is in the VC-1 format and be transcoded into output video data in the H.264 format. Video processing conditions can include the type of processing that is needed or to be done such as decoding, encoding, playback, transcoding, resizing, upsampling, downsampling, de-interlacing, color conversion, and other like video processing. In one implementation, scenarios can include default conditions. For example, a default condition assumes the input video data is in high definition, because high definition video processing often uses more resources when processed, and can benefit from optimized combinations of video processing tools. In other implementations, the input data resolution is not a default resolution and can vary for different scenarios. For example, a scenario can include a condition that input video data in a high resolution format is to be transcoded from one data format to another data format in low resolution with the use of a video processor, encoder and decoder.

For each scenario an indication of the video processing tool combination to be used for processing video under the conditions of the scenario is stored in the data store. In FIG. 3, an entry in the column for the indicated scenario 305 corresponds to an entry in the column for the video processing tool combination 310. A scenario can include system conditions, processing conditions, and other conditions. For example, indicated scenario 315 includes a system condition for a power resource 320 and a processing condition for a video format 325. Indicated scenario 315 corresponds with information listing video processing tool combination to be used under the conditions of indicated scenario 315. Video processing tool combination 330 includes a decoder for decoding the video format 325 under conditions of power resource 320, as indicated by the scenario processing condition of scenario 315.

Figures 4A, 4B:
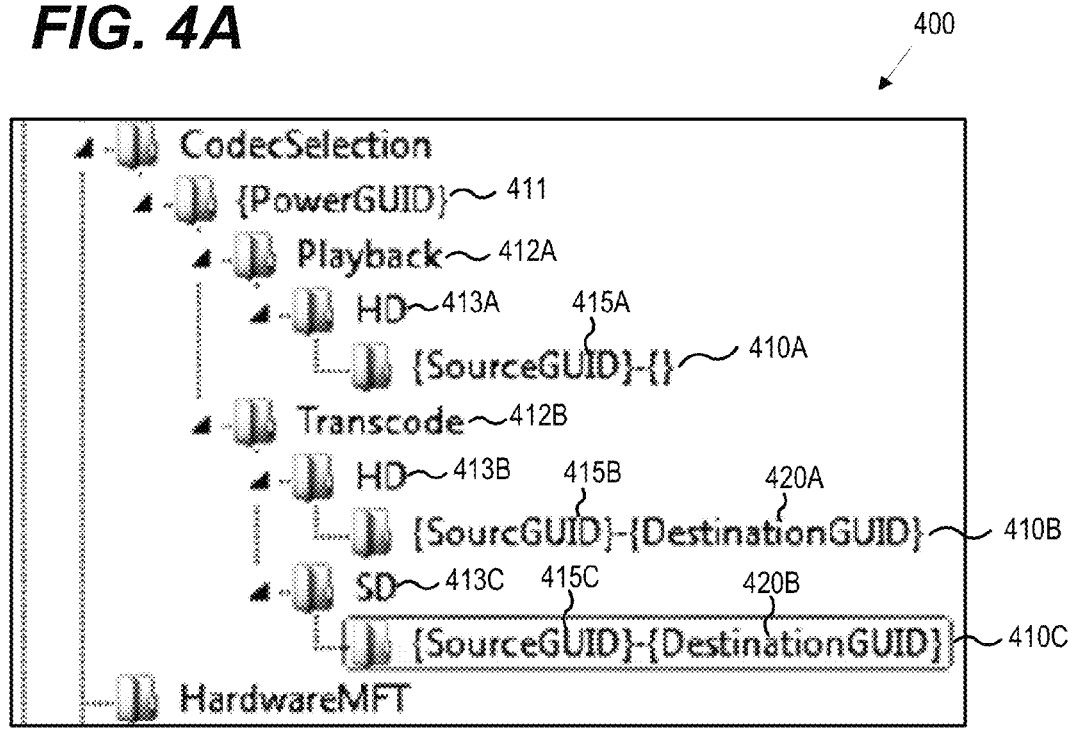
FIG. 4A illustrates an exemplary data store for storing video processing tool configuration information.
FIG. 4B illustrates video processing tool combination information stored under a registry key.

FIG. 4A illustrates an exemplary data store 400 for storing video processing tool configuration information. In the example of FIG. 4A, the data store 400 is a registry that includes registry keys 410A-C that correspond to predetermined scenarios for processing video data. A registry key can be stored for a predetermined scenario. The organization of the data store 400 is a hierarchy structure that branches according to scenario conditions. Each sub-branch of the hierarchy includes the scenario conditions of the branches they branch from. The scenario conditions include a power resource condition 411, use case conditions 412A-B (e.g., playback and transcoding), and output resolution conditions 413A-C. In other implementations, the hierarchy structure can branch on other scenario conditions such as input quality conditions, processing resource conditions and other conditions. The registry keys 410A-C include source video format identifiers 415A-C. The source video format identifiers 415A-C indicate video formats for processing by the video processing tool combination associated with the registry keys 410A-C. The registry keys 410B-C also include output video format identifiers 420A-B. For the transcoding branches, the output video format identifiers 420A-B indicate video formats that processed video data will be converted to by the video processing tool combination associated with the registry keys 410B-C. Thus, different registry keys can represent different combinations of decoder/video processor/encoder to be used for transcoding depending on the permutation of video format conversion (e.g., VC-1 to H.264, MPEG-2 to H.264, MPEG-2 to VC-1, etc.) As shown by registry key 410A, the registry key can have a source video format identifier without an output video format identifier. Registry key 410A stores information for use in playback of high definition video in a video format specified by source video format identifier 415A.

Registry keys 410B-C store information for scenarios that include transcoding of video data. Registry key 410C stores information for the scenario of transcoding of video data from a source video format to an output video format where the processed video data will be encoded in a standard definition resolution. FIG. 4B illustrates the video processing tool combination information 430 stored under or corresponding to registry key 410C. In the example of FIG. 4B there are multiple values 450A-C included in the video processing tool combination information 430. The values 450A-C are indicators of the video processing tools to be used for processing video under the conditions indicated by the registry key 410C. In FIG. 4B, the values 450A-C are expandable string values. Value 450A indicates a decoder to be used in the transcoding of video data. Value 450B indicates an encoder to be used in the transcoding of video data. Value 450C indicates a video processor to be used in the transcoding of video data. In the examples of FIGS. 4A-B the resolution of the source video data is set to the default of high definition resolution. In other implementations, the configuration information in a data store can indicate a resolution of the source or input video for a predetermined scenario.

FIG. 5 is a schematic diagram showing an exemplary system 500 for storing video processing tool configuration information. In the example, at 505, video processing tool combinations 510A-N are available for use by the system 500. Each of the video processing tool combinations 510A-N can include one or more video processing tools included in the system 500. The video processing tool combinations 510A-N are determined by enumerating the one or more video processing tools available to the system and determining combinations of the enumerated video processing tools based on permutations of the enumerated video processing tools. The performance of the video processing tool combinations are measured as shown at 515. Video data 520 is processed by a given video processing tool combination 525, and one or more performance measurements 530 A-N are taken. The video data 520 is selected bitstreams or video clips in appropriate video formats as part of a test suite. In some implementations, each of the selected video clips used as input as part of the test suite can be different. The video data can vary in resolutions, formats, lengths, complexity, and other features that can affect video processing performance. In one implementation, the video data can be selected as a typical video or videos that a user would process using a computer. In other implementations, any video data can be used.

The performance measurements 530 A-N are used by system 500 to determine a video processing tool combination to be used for a predetermined scenario. The performance measurement 530A measures the amount of time the video processing tool combination 510C spends processing the video data. In some implementations, the processing time or performance time can be measured from an end-to-end processing of the video processing tool combination. For example, when video is processed, a timer can be started based on a starting event (e.g., the beginning of video processing) and the timer can be stopped based on an ending event (e.g., the end of video processing) to measure an end-to-end processing time. The end-to-end processing time can include the processing time of each of the processing tools used to process the video according to the processing path. In some implementations, the processing tools used to process video can share use of system resources. For example, in transcoding using software video processing tools, the software tools can share the processing resources of a processor (e.g., CPU) and memory. Measuring end-to-end processing time can determine a processing time under conditions of shared resources. Because running multiple software applications (e.g., software encoder or decoder, software video processors, or other programs) can degrade performance of a CPU, measuring end-to-end processing can account for degraded performance of a CPU. In other implementations, processing time can be measured for individual video processing tools and the individual measurements can be combined or added to determine a total processing time for a combination of video processing tools. For example, video data can be processed by a video decoder and encoder for transcoding, and the processing time of the decoder can be added with the processing time of the encoder for the video data to determine the total processing time for the combination of the decoder and encoder to process the video data. In yet further implementations, processing time can be measured in some other manner.

The performance measurement 530B measures the quality of the video produced by the video processing tools. For example, an encoder can encode a video clip, and a metric can be used to determine the quality of the encoded video (for a set bitrate) or the bitrate of the encoded video (for a set level quality). The metric for measurement can be one that is used before or after decoding the encoded video. In other implementations, the quality of video can be measured using other techniques such as input from a user. The power consumption measurement 530C measures the power consumption of the system 500 or a component of the system 500 during the processing of the video data 520 by video processing tool combination 525. For example, a battery, power meter, or other device can be used to determine how much power is consumed during the processing of the video data by the video processing tool combination 525. The performance measurement 530N represents other performance indicators that can be measured during the processing of the video data 520 by video processing tool combination 525.

The performance measurements 530 A-N for each of the video processing tool combinations 510A-N are compared for different scenarios as shown at 535. For example, for a scenario of transcoding video data using a decoder, a video processor, and an encoder, each of the combinations that use a decoder, video processor, and an encoder for transcoding can be compared. A video processing tool combination can be chosen for each scenario based on the comparison. For example, the video processing tool combination that has the fastest processing time can be chosen. In other implementations, the video processing tool combination that is chosen can be chosen based on other performance measurements and comparisons. For each scenario a combination is chosen to be used to process video data under the conditions of the scenario. Information is set indicating the chosen combinations for the scenarios, respectively, as shown at 540. The video processing tool configuration information can be stored in a data store. For example, the information can be stored as a registry key in a registry. In other implementations, the video processing tool configuration information can be stored in another data store where the information can be accessed by the system to process video data.

Figure 6:
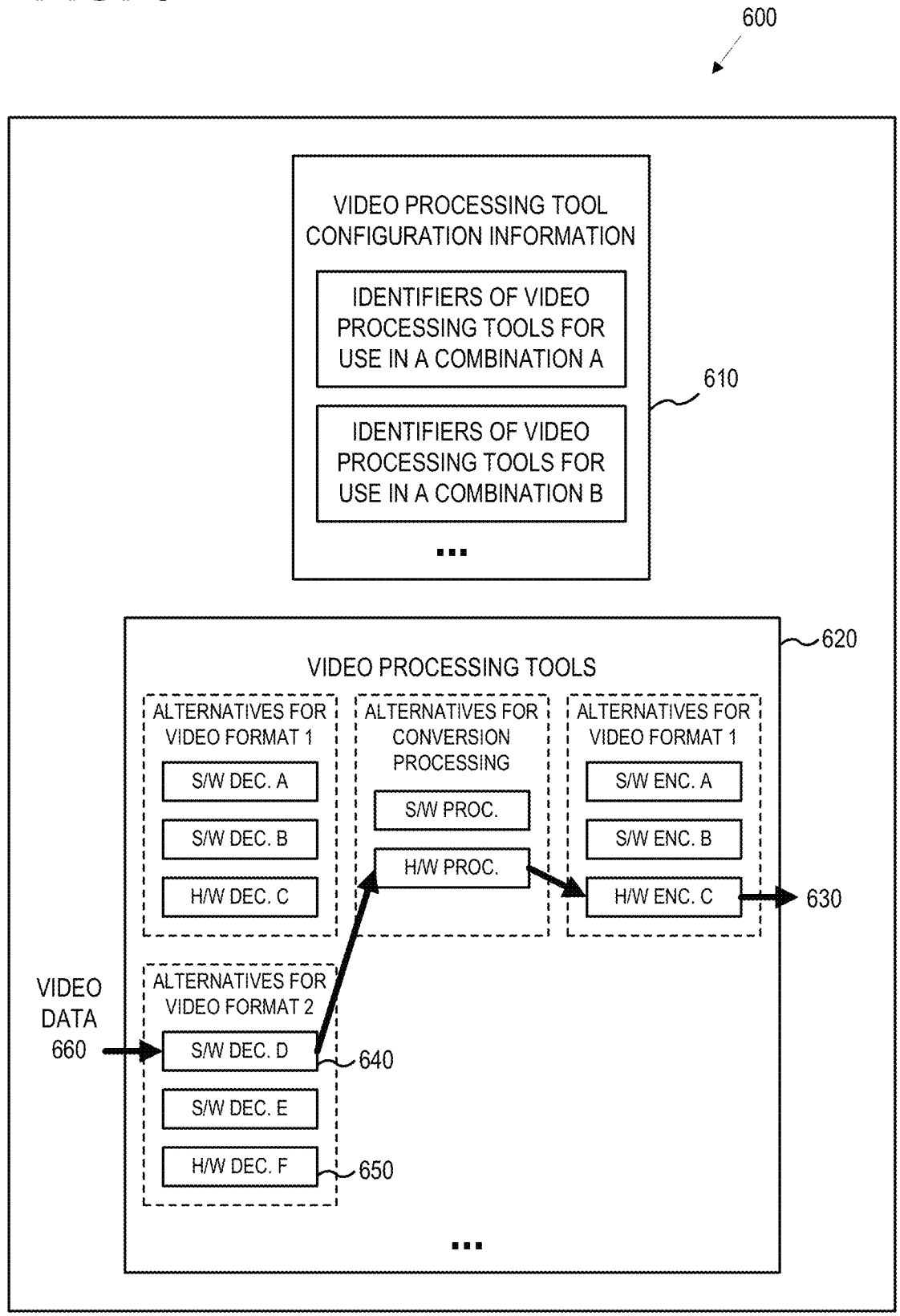
FIG. 6 is a schematic diagram of an exemplary system that processes video data using video processing tool configuration information.

FIG. 6 is a schematic diagram of an exemplary system 600 that uses video processing tool configuration information to process video data. In the example, system 600 includes configuration information 610. The configuration information 610 identifies one or more combinations of video processing tools 620, which are to be used in combination for processing video, such as video processing tool combination 630. The video processing tool configuration information 610 can be generated using the process described by FIG. 2, or the configuration information can be generated in some other way. For example, the processing tool configuration information can be determined for a similar system (e.g., similar hardware and software), and transferred to the system 600 to be stored for use by the system 600. (In FIG. 6, the video processing tools 620 match the video processing tools 110 shown in FIG. 1.) The video processing tools 620 can include, for a given video format, a software video processing tool such as the software decoder D 640 and a hardware video processing tool such as the hardware decoder F 650. The system 600 also includes video data 660 that is processed by video processing tool combination 630 for transcoding, based on identifiers in the configuration information 610. The video processing tool combination 630 includes the software video decoder D 640, the hardware conversion processor, and the hardware encoder C.

Figure 7:
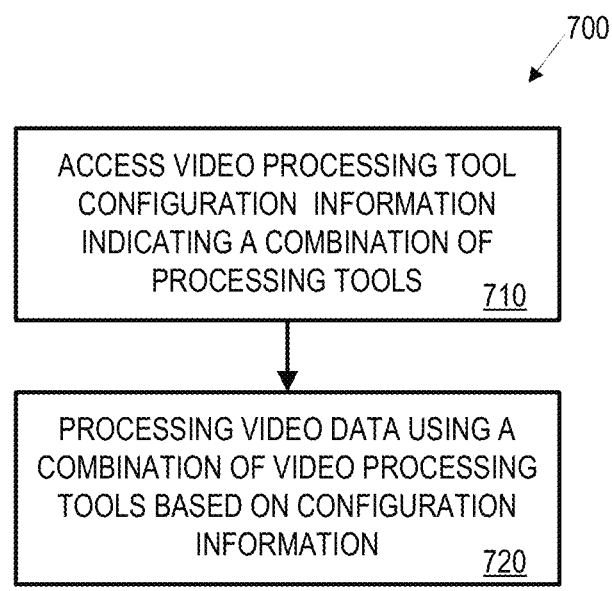
FIG. 7 is a flowchart of an exemplary method for processing video data based on video processing tool configuration information.

FIG. 7 is a flowchart of an exemplary method 700 for processing video data based on video processing tool configuration information. In the example, configuration information indicating a combination of processing tools is accessed at block 710. For example, when video data is to be processed, a software application can access the configuration information to identify a combination of video processing tools to be used in processing the video under conditions of a scenario. The predetermined scenario can be the current scenario conditions of the computing system or predetermined conditions of a scenario. For example, the resolution of video data to be processed, a currently desired video processing quality, or resources of a computer system can be assessed to determine current scenario conditions.

In some cases, the configuration information includes multiple available combinations that are adapted for different input video qualities (e.g., HD, SD, or another spatial resolution, 25 Hz, 29.94 Hz, 30 Hz or another temporal resolution). The input video quality of the video data is determined. Based at least in part on the input video quality (and possibly other conditions), the combination is selected from the multiple available combinations represented in the configuration information.

In other cases, the configuration information includes multiple available combinations that are adapted for different use cases (e.g., decoding, transcoding, encoding or another operation). The use case for the processing of the video data is determined. Based at least in part on the use case (and possibly other conditions), the combination is selected from the multiple available combinations represented in the configuration information.

In other cases, the configuration information includes multiple available combinations that are adapted for different patterns of power consumption (e.g., battery power, DC power from outlet). The power resource for the processing of the video data is evaluated. Based at least in part on the evaluations of the power resource (and possibly other conditions), the combination is selected from the multiple available combinations represented in the configuration information.

In other cases, the configuration information includes multiple available combinations that are adapted for different patterns of expected CPU utilization (e.g., CPU idle, CPU busy). The expected CPU utilization is evaluated. Based at least in part on the evaluation of the expected CPU utilization (and possibly other conditions), the combination is selected from the multiple available combinations represented in the configuration information.

In still other cases, the configuration information includes scenarios that incorporate multiple conditions. The scenarios can branch arbitrarily to account for different conditions. For example, the scenarios can first branch based on use case (e.g., decoding, transcoding, encoding, or another operation). Within the decoding path or transcoding path, the scenarios can next branch based on expected pattern of power consumption, and so on.

Software (e.g., media playing software) can access the video processing tool configuration information to configure the software for video processing according to a predetermined scenario. For example, software that implements a media pipeline can access the configuration information by reading a registry key to configure the media pipeline so that the appropriate video processing tools identified by the registry key information are used when video is processed in various formats or under other predetermined scenario conditions. The configuration information can be accessed before or after it is identified that a particular video is to be processed. That is to say, the accessing can be done when a computer has no particular video to process, or the accessing can be done when the system has a particular video to process.

The indicated combination of processing tools can include a software video processing tool. For example, in a computing system that has both software and hardware encoders (or decoders) capable of or configured for a particular video processing (e.g., encoding or decoding), the software encoder (or decoder) can be included in the indicated combination of video processing tools. That is to say, even when both the software encoder (or decoder) and the hardware encoder (or decoder) are capable of processing video data to produce a particular video output to or from a particular video data format, the software encoder (or decoder) may be chosen to process video in combination with other video processing tools instead of the hardware encoder (or decoder).

At block 720, based at least in part on the video processing tool configuration information, video data is processed using the combination of video processing tools indicated by the configuration information. For example, for a particular scenario for processing video, one or more video processing tools are used because the one or more video processing tools are identified by the processing tool configuration information to be used under the conditions of the scenario. Because the identified video processing tools have been selected as the combination that can provide suitable performance for the scenario, the combination is used to process video instead of other available combinations of video processing tools for the desired processing path. In general, the video data can be high resolution (e.g., HD) video or low resolution (e.g., SD) video. The video data can be in or processed into a video format such as VC-1, H.264, or some other video compression format. The video data can be received for processing from a remote device such as a server (e.g., streaming video), from a storage medium (e.g., disk drive or DVD), or from some other source.

The processed video data can be output for display, storage, transmission, or other use of video data.

Alternatively, the technique 700 shown in FIG. 7 is used to process other media data based on processing tool configuration information. For example, the technique 700 is used to process audio data based on audio processing tool configuration information. In this case, configuration information indicating a combination of processing tools is accessed. For example, when audio data is to be processed, a software application can access the configuration information to identify a combination of audio processing tools to be used in processing the audio under conditions of a scenario. Then, based at least in part on the configuration information, audio data is processed using the combination of audio processing tools indicated by the configuration information. For example, for a particular scenario for processing audio, one or more audio processing tools are used because the audio processing tool(s) are identified by the configuration information to be used under the conditions of the scenario.

Figure 8:
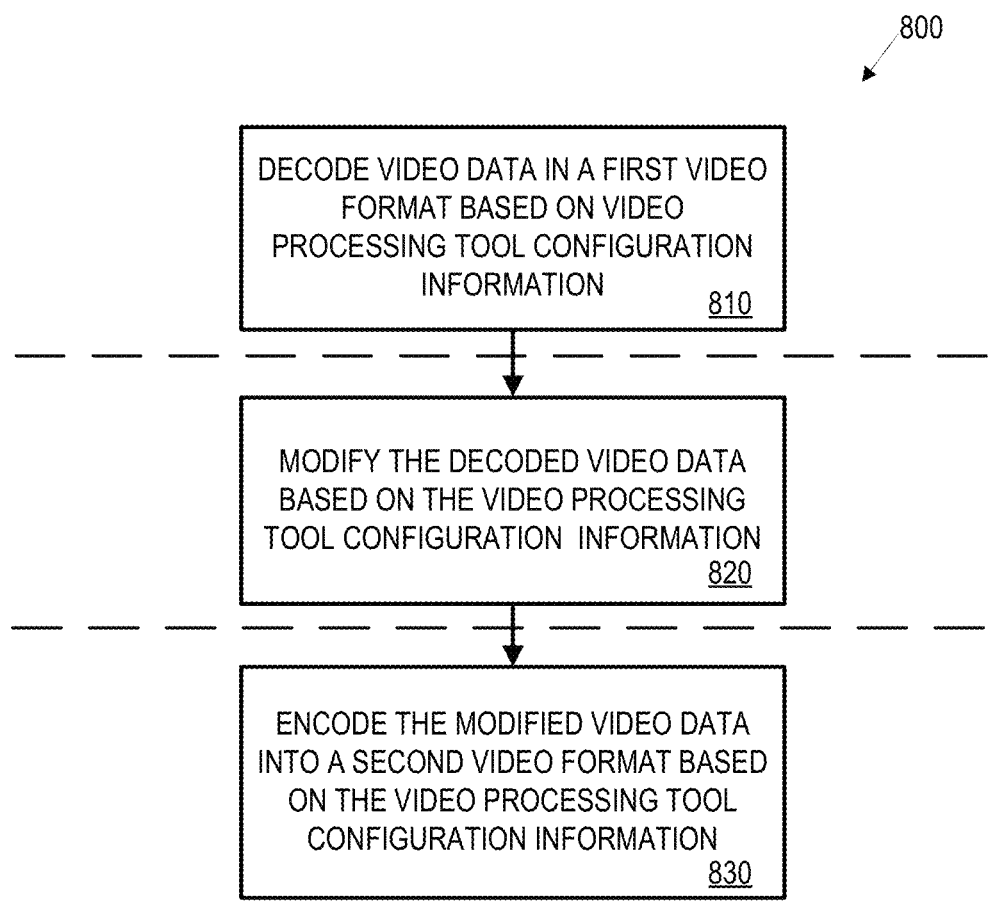
FIG. 8 is a flowchart of an exemplary method of transcoding video data using video processing tool configuration information.

FIG. 8 is a flowchart of an exemplary method 800 of transcoding video data using video processing tool configuration information. In the example, video data in a first video format is decoded based on video processing tool configuration information at block 810. For example, the video data is decoded using a decoder identified by the configuration information. At block 820, the decoded video data is modified based on the configuration information. For example, the decoded video data is processed by a video processer identified by the configuration information. As indicated by the dashed lines, the block 820, in some implementations, block 820 can be omitted and the decoded video data is not processed by a video processor. At block 830, the modified video data is encoded into a second video data format based on the configuration information. For example, the modified video data is encoded by an encoder identified by the configuration information.

Figure 9:
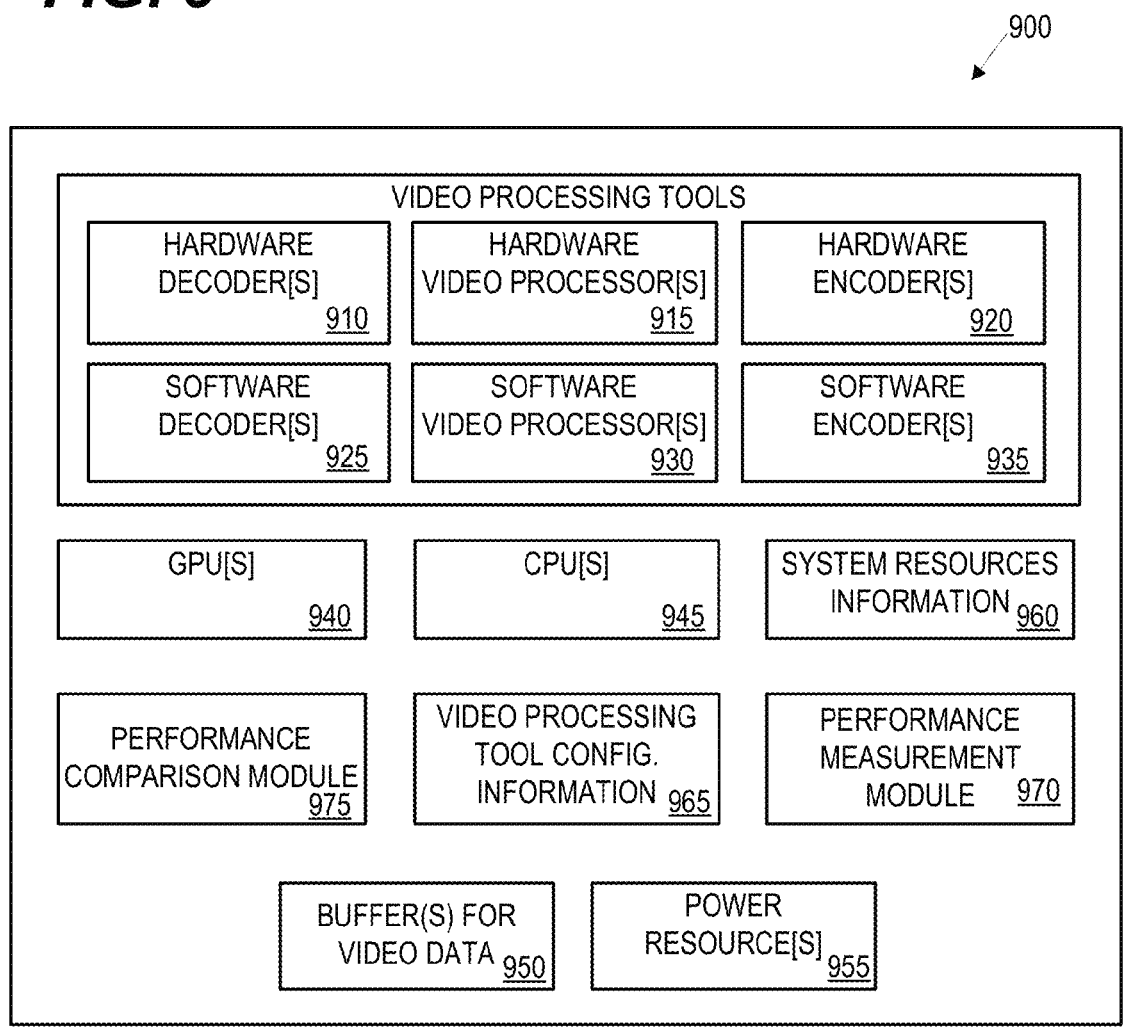
FIG. 9 is a schematic diagram of a system for processing video data using video processing tool configuration information.

FIG. 9 is a schematic diagram of a system 900 for processing video data using video processing tool configuration information. In the example, system 900 includes one or more hardware decoders 910 (for the same format or different formats), one or more hardware video conversion processors 915, and one or more hardware encoders 920 (for the same format or different formats). Also, system 900 includes one or more software decoders 925 (for the same format or different formats), one or more software video conversion processors 930, and one or more software encoders 935 (for the same format or different formats). In other implementations, a computing system can include a subset of these video processing tools. Additionally, the system 900 includes one or more GPUs 940, one or more CPUs 945, one or more buffers for video data 950 (encoded video data and reconstructed video data), and one or more power resources 955. In some implementations, a power resource can include a battery, or other resource that can provide electricity to a computing system. Further, the system 900 includes system resources information 960. For example, system resources information can indicate system conditions such as power resource conditions, processing resource conditions, memory resource conditions, processing tool conditions or other computing system conditions that can influence the performance of video processing. The system resource information can be used to determine the conditions of a computing system that correspond to a scenario for which video processing tool configuration information has been stored. For example, from system resource information it can be determined that the computer is running from battery power, so a low power profile scenario is applicable, and the configuration information corresponding to a low power profile can be accessed to determine what video processing tools should be used to process video under low power conditions.

System 900 also includes video processing tool configuration information 965 identifying video processing tools to be used for processing video in different scenarios. The system 900 can further include a performance measurement module 970 for measuring performance of video processing tool combinations and a performance comparison module 975 for comparing performances of video processing tool combinations.

Figure 10:
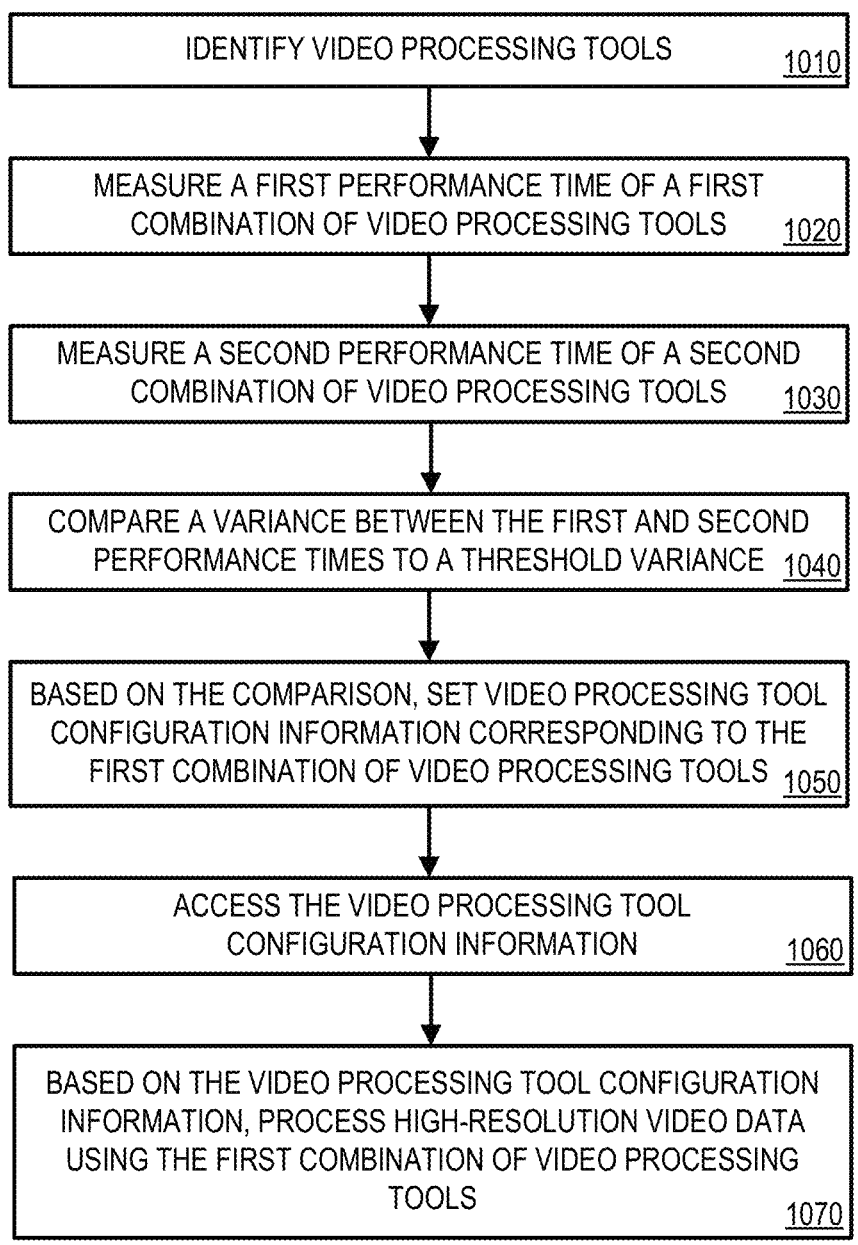
FIG. 10 is a flowchart of an exemplary method of processing high definition video data based on video processing tool configuration information.

FIG. 10 is a flowchart of an exemplary method 1000 of processing high-definition video data based on video processing tool configuration information. In the example, video processing tools are identified at block 1010. For example, the video processing tools that can be used are enumerated and identified. At block 1020, a first performance time of a first combination of video processing tools is measured. For example, a combination of the enumerated video processing tools that includes a software video processing tool is used to process video data, and an end-to-end processing time is measured as a performance time. At block 1030, a second performance time of a second combination of video processing tools is measured. For example, a second combination of video processing tools, including a hardware video processing tool that is capable of the video processing done by the software video processing tool, is used to process the video data (e.g., the same video data), and the end-to-end processing time is measured as a performance time. At block 1040, a variance between the first and second performance times is compared to a threshold variance. For example, a combination with a software video processing tool can outperform a combination with the corresponding hardware video processing tool, and a variance between the processing times can be determined. The determined variance can be compared to a threshold variance, and if the variance is larger than a threshold variance, the first combination is chosen as a suitable combination. Otherwise, the second combination is chosen as a suitable combination. At block 1050, based at least in part on the comparison, configuration information is set identifying the first combination of video processing tools. At block 1060, the configuration information is accessed. For example, the configuration information is accessed by software to identify the video processing tools to be used based on a scenario applicable to the current conditions. At block 1070, high-resolution video data is processed using the first combination of video processing tools based on the configuration information.

Alternatively, the technique 1000 shown in FIG. 10 is used to process other media data (such as audio data) based on processing tool configuration information.

Exemplary Computing System

The described embodiments, techniques, and technologies can be implemented using software and/or hardware of a computing environment, such as a computing system. Suitable computing systems include server computers, desktop computers, laptop computers, notebook computers, netbooks, tablet devices, mobile devices, and other types of computing devices (e.g., devices such as televisions, media players, or other types of entertainment devices that comprise computing capabilities such as audio/video streaming capabilities and/or network access capabilities). The techniques and solutions described herein can be performed in a cloud computing environment (e.g., comprising virtual machines and underlying infrastructure resources of a computing system distributed across a network).

Figure 11:
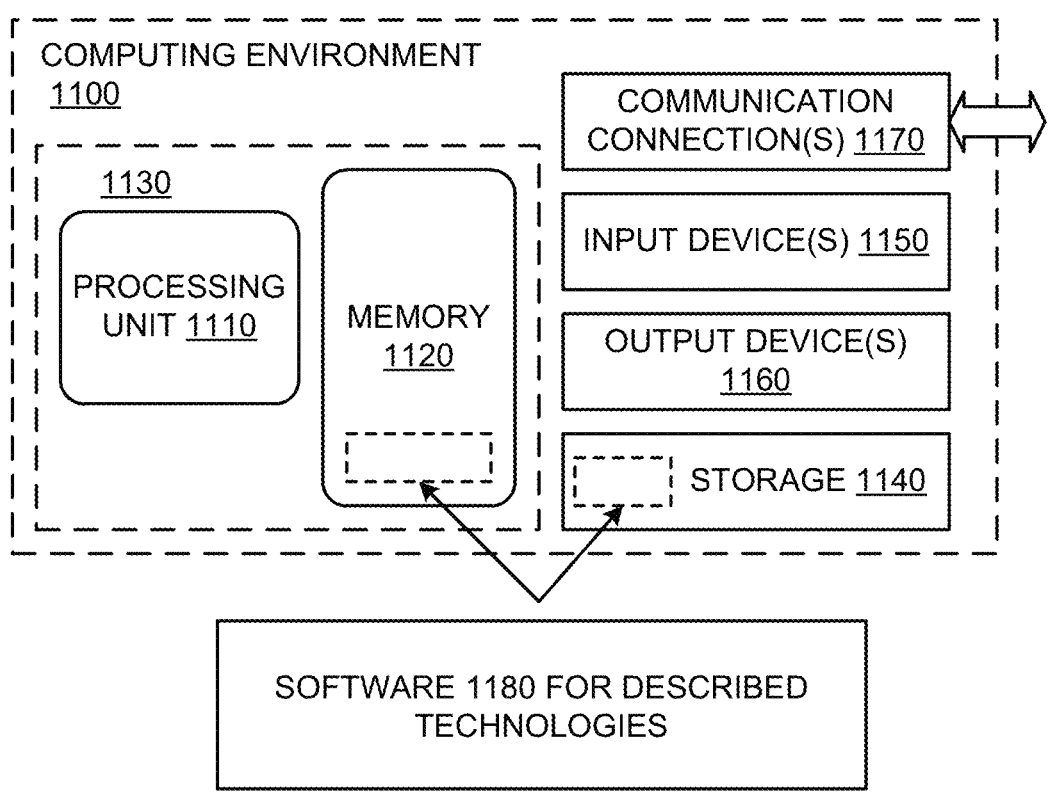
FIG. 11 is a schematic diagram illustrating a generalized example of a suitable computing system for any of the disclosed embodiments.

FIG. 11 illustrates a generalized example of a suitable computing environment 1100 in which described embodiments, techniques, and technologies can be implemented. The computing environment 1100 is not intended to suggest any limitation as to scope of use or functionality of the technology, as the technology may be implemented in diverse general-purpose or special-purpose computing environments. For example, the disclosed technology may be implemented using a computing system (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including microprocessor-based or programmable consumer electronics, network PCs, minicomputers, mainframe computers, a collection of client/server systems, or the like. The disclosed technology may also be practiced in distributed computing environments where tasks are performed by remote processing devices that are linked through a communications network. In a distributed computing environment, program modules may be located in both local and remote memory storage devices.

With reference to FIG. 11, the computing environment 1100 includes at least one central processing unit 1110 and memory 1120. In FIG. 11, this most basic configuration 1130 is included within a dashed line. The central processing unit 1110 executes computer-executable instructions. In a multi-processing system, multiple processing units execute computer-executable instructions to increase processing power and as such, multiple processors can be running simultaneously. The memory 1120 may be volatile memory (e.g., registers, cache, RAM), non-volatile memory (e.g., ROM, EEPROM, flash memory, etc.), or some combination of the two. The memory 1120 stores software 1180 that can, for example, implement the technologies described herein for adaptive selection of media processing tools in media decoding, media encoding, media transcoding from one quality or bitrate to another, media transcoding from one format to another, or other media processing. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other tangible storage medium which can be used to store information and which can be accessed within the computing environment 1100. The storage 1140 stores computer-executable instructions for the software 1180, which can implement technologies described herein for adaptive selection of media processing tools in media decoding, media encoding, media transcoding from one quality or bitrate to another, media transcoding from one format to another, or other media processing.

The input device(s) 1150 may be a touch input device, such as a keyboard, keypad, mouse, pen, touch screen, or trackball, a voice input device, a scanning device, or another device, that provides input to the computing environment 1100. For audio, the input device(s) 1150 may be a sound card or similar device that accepts audio input in analog or digital form, or a CD-ROM reader that provides audio samples to the computing environment 1100. For video, the input device(s) 1150 may be a camera, TV tuner card, video card or similar device that accepts video input in analog or digital form, or optical disk reader that provides video samples to the computing environment 1100. The output device(s) 1160 may be a display, printer, speaker, CD-writer, DVD-writer, or another device that provides output from the computing environment 1100.

The communication connection(s) 1170 enable communication over a communication medium (e.g., a connecting network) to another computing entity. The communication medium conveys information such as computer-executable instructions, video data, compressed graphics information, or other data in a modulated data signal.

Exemplary Implementation Environment

Figure 12:
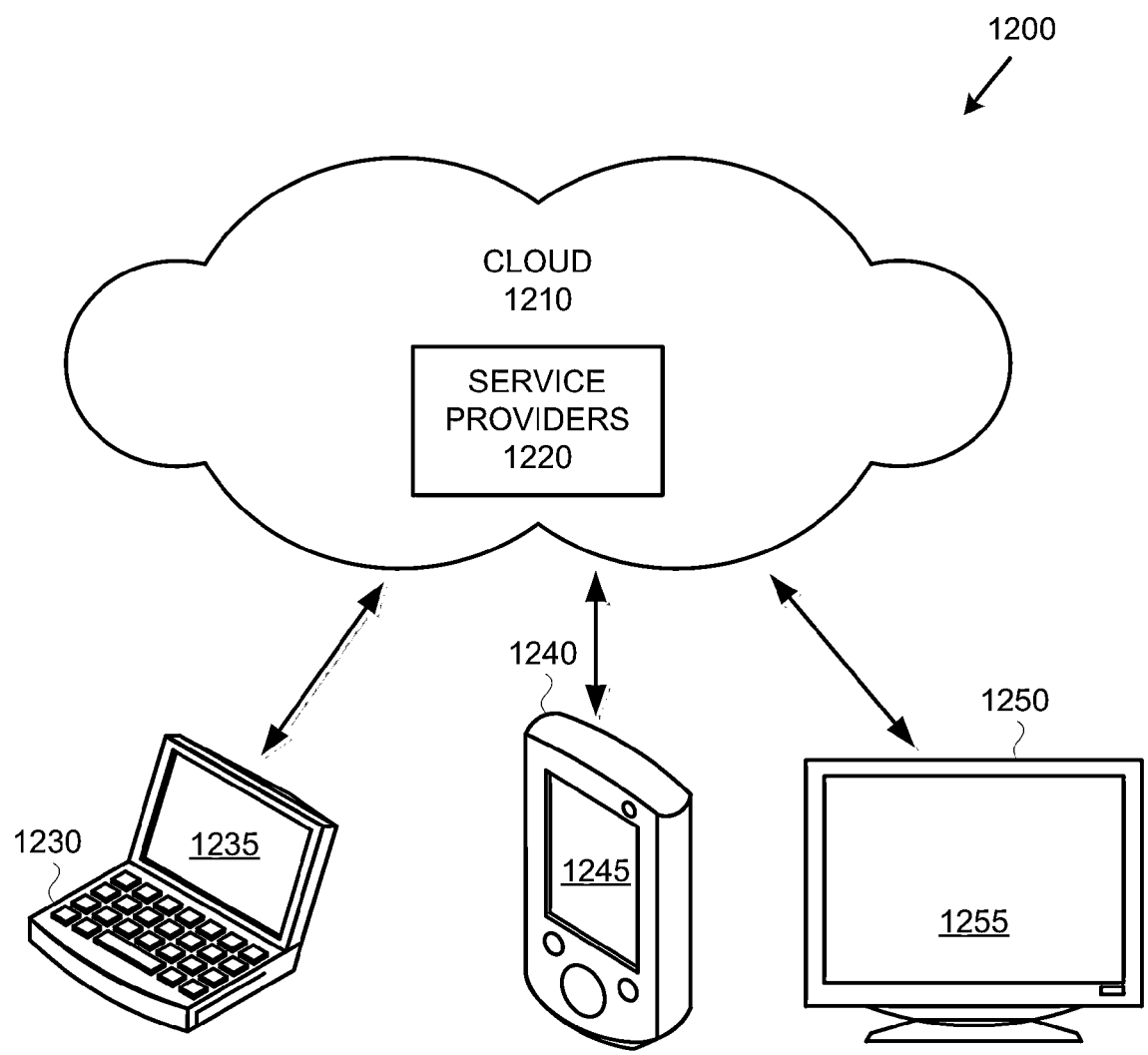
FIG. 12 is a schematic diagram illustrating a generalized example of a suitable implementation environment for any of the disclosed embodiments.

FIG. 12 illustrates a generalized example of a suitable implementation environment 1200 in which any of the described embodiments, techniques, and technologies can be implemented.

In example environment 1200, various types of services (e.g., computing services) are provided by a cloud 1210. For example, the cloud 1210 can comprise a collection of computing devices, which may be located centrally or distributed, that provide cloud-based services to various types of users and devices connected via a network such as the Internet. The implementation environment 1200 can be used in different ways to accomplish computing tasks. For example, some tasks (e.g., processing user input and presenting a user interface) can be performed on local computing devices (e.g., connected devices 1230, 1240, 1250) while other tasks (e.g., storage of data to be used in subsequent processing) can be performed in the cloud 1210.

In example environment 1200, the cloud 1210 provides services for connected devices 1230, 1240 1250 with a variety of screen capabilities. Connected device 1230 represents a device with a computer screen 1235 (e.g., a mid-size screen). For example, connected device 1230 could be a personal computer such as desktop computer, laptop, notebook, netbook, or the like that implement adaptive selection of media processing tools in media decoding or media encoding. Connected device 1240 represents a device with a mobile device screen 1245 (e.g., a small size screen). For example, connected device 1240 could be a mobile phone, smart phone, personal digital assistant, tablet computer, and the like that implement adaptive selection of media processing tools in media decoding. Connected device 1250 represents a device with a large screen 1255. For example, connected device 1250 could be a television screen (e.g., a smart television) or another device connected to a television (e.g., a set-top box or gaming console) or the like that implement adaptive selection of media processing tools in media decoding. One or more of the connected devices 1230, 1240, 1250 can include touch screen capabilities. Devices without screen capabilities also can be used in example environment 1200. For example, the cloud 1210 can provide services for one or more computers (e.g., server computers) without displays that implement adaptive selection of media processing tools in media transcoding from one quality or bitrate to another, media transcoding from one format to another, or other media processing.

Services can be provided by the cloud 1210 through service providers 1220, or through other providers of online services (not depicted). For example, cloud services can be customized to the screen size, display capability, and/or touch screen capability of a particular connected device (e.g., connected devices 1230, 1240, 1250).

In example environment 1200, the cloud 1210 provides the technologies and solutions described herein to the various connected devices 1230, 1240, 1250 using, at least in part, the service providers 1220. For example, the service providers 1220 can provide a centralized solution for various cloud-based services. The service providers 1220 can manage service subscriptions for users and/or devices (e.g., for the connected devices 1230, 1240, 1250 and/or their respective users).

Many of the examples presented herein involve video data and video processing. More generally, techniques and tools described herein with reference to video data or video formats can be used when processing media data in media formats. The media can be video, audio, image or other media.

For example, for audio, configuration information identifying a suitable combination of audio processing tools can be set as follows. Audio processing tools of a computing system are identified. The audio processing tools can include multiple alternative audio decoder implementations for a first audio format (such as a hardware decoder and software decoder for decoding from the first audio format), multiple alternative audio conversion processing implementations (such as a hardware conversion processor and software conversion processor for filtering, etc.), and/or multiple alternative audio encoder implementations for a second audio format (such as a hardware encoder and software encoder for encoding to the second audio format, which may be the same as or different from the first audio format). Performance of combinations of the identified audio processing tools is measured, and performance measurements are compared. For example, audio processing times of the combinations are measured and compared. Then, based at least in part on the comparison, the audio processing tool configuration information is set. In addition to processing time, factors such as rate-distortion performance (in terms of quality and/or bitrate after encoding or transcoding) and power consumption can be considered in setting the configuration information. The configuration information for audio processing tools can be separate from configuration information for video processing tools. Or, the configuration information can be combined for audio processing tools and video processing tools and organized by scenarios in which both audio processing tools and video processing tools are used.

Configuration information for combinations of audio processing tools can be used as follows. The configuration information indicating a combination of audio processing tools is accessed. Based at least in part on the configuration information, audio data is processed using the combination of audio processing tools indicated in the configuration information. The configuration information can indicate multiple combinations of audio processing tools, and different combinations can be selected for different scenarios. For example, based at least in part on audio quality of audio data, a combination is selected from multiple available combinations that are adapted for different audio qualities. As another example, based at least in part on use case such as decoding, encoding or transcoding, a combination is selected from multiple available combinations that are adapted for different use cases. Or, based at least in part on a power resource, a combination is selected from multiple available combinations that are adapted for different patterns of power consumption. As another example, based at least in part on expected utilization of a CPU, a combination is selected from multiple available combinations that are adapted for different patterns of CPU utilization.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computing system (e.g., any suitable commercially available computer) or in a networked computing system (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, an intranet, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

Moreover, although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method implemented at least in part by a computing system, the method comprising:

in the computing system:

identifying a plurality of video processing tools comprising at least one video decoder and at least one video encoder;

measuring performance of a first combination of one or more of the plurality of video processing tools to produce a first performance measurement for a first transcoding path;

comparing the first performance measurement for the first transcoding path with a second performance measurement of a second combination of one or more of the plurality of video processing tools for a second transcoding path different than the first transcoding path, wherein the comparing comprises determining a variance between the first and second performance measurements by calculating a difference between processing times associated with the first and second performance measurements;

based at least in part on the comparing, setting video processing tool configuration information, wherein the setting of video processing tool configuration information comprises selecting one of the first combination or the second combination based on the determined variance; and storing the video processing tool configuration information, the stored video processing tool configuration information being available for use in selecting between multiple transcoding paths including the first transcoding path and the second transcoding path.

2. The method of claim 1, wherein the setting the video processing tool configuration information comprises determining that the first combination performs better than the second combination and selecting the first combination to be identified by the video processing tool configuration information for use under conditions of a scenario.

3. The method of claim 1, wherein the first performance measurement comprises a first processing time and the second performance measurement comprises a second processing time, and wherein the comparing the first performance measurement with the second performance measurement comprises determining that the first processing time is less than the second processing time.

4. The method of claim 1, wherein the comparing further comprises:

comparing the variance to a threshold variance, wherein the threshold variance is preconfigured to account for difference in processing loads for the first and second transcoding paths.

5. The method of claim 1, wherein the plurality of video processing tools comprises plural alternative video decoder implementations for a first video format, plural alternative video conversion processor implementations, and plural alternative video encoder implementations for a second video format.

6. The method of claim 5, wherein the plural alternative video decoder implementations include a hardware decoder, a first software decoder implementation for central processing unit (CPU), and a second software decoder implementation for CPU and graphics processing unit (GPU), and wherein the plural alternative video encoder implementations include a hardware encoder, a first software encoder implementation for CPU, and a second software encoder implementation for CPU and GPU.

7. The method of claim 1 wherein measuring the performance of the first combination comprises measuring processing time, rate-distortion performance, and/or power consumption.

8. The method of claim 1, wherein the video processing tool configuration information indicates the first combination is to be used for processing video data under a first scenario, and wherein the video processing tool configuration information indicates the second combination is to be used for processing the video data under a second scenario.

9. The method of claim 8, wherein the first scenario differs from the second scenario in terms of use case, power consumption, video input quality and/or expected utilization of a central processing unit.

10. The method of claim 1, further comprising:
receiving video data;
accessing the stored video processing tool configuration information; and
processing the video data, the processing the video data comprising using the first combination based at least in part on the stored video processing tool configuration information.

11. A computing system, the computing system comprising:
a processor;
a plurality of video processing tools, the plurality of video processing tools comprising plural alternative video decoder implementations for a first video format, plural alternative video conversion processor implementations, and plural alternative video encoder implementations for a second video format,
wherein the plurality of video processing tools form a plurality of transcoding paths, each transcoding path associated with a corresponding performance measurement; and
memory, the memory storing computer-executable instructions that do not constitute a signal, which when executed cause the computing system to perform a method, the method comprising:
accessing video processing tool configuration information indicating a combination of one or more of the plurality of video processing tools for at least one of the plurality of transcoding paths;
determining a performance measurement for the at least one of the plurality of transcoding paths based on the accessed video processing tool configuration information; and
based at least in part on the video processing tool configuration information, processing video data using the combination of one or more video processing tools with the determined performance measurement.

12. The computing system of claim 11, wherein the method further comprises:
determining video quality of the video data; and
based at least in part on the video quality, selecting the combination from among multiple available combinations in the configuration information, the multiple available combinations being adapted for different video qualities.

13. The computing system of claim 11, wherein the method further comprises:
determining use case for the processing of the video data; and
based at least in part on the use case, selecting the combination from among multiple available combinations in the configuration information, the multiple available combinations being adapted for different use cases, the different use cases including decoding from the first video format and transcoding from the first video format to the second video format.

14. The computing system of claim 11 wherein the method further comprises:
evaluating a power resource; and
based at least in part on the evaluation of the power resource, selecting the combination from among multiple available combinations in the configuration information, the multiple available combinations being adapted for different patterns of power consumption.

15. The computing system of claim 11 wherein the method further comprises:
evaluating a expected utilization of a central processing unit (CPU); and
based at least in part on the evaluation of the expected utilization of the CPU, selecting the combination from among multiple available combinations in the configuration information, the multiple available combinations being adapted for different patterns of utilization of the CPU.

16. The computing system of claim 11, wherein the plural alternative video decoder implementations include a hardware video decoder and a software video decoder.

17. The computing system of claim 11, wherein the plural alternative video encoder implementations include a hardware video encoder and a software video encoder.

18. The computing system of claim 11, wherein the plural alternative video conversion processor implementations include a hardware video processor and a software video processor.

19. The computing system of claim 11, wherein the combination is a first combination associated with a first performance measurement, and wherein the method further comprises:
measuring performance of a second combination of one or more of the plurality of video processing tools to produce a second performance measurement;
comparing the first performance measurement with a second performance measurement; and
based at least in part on the comparing, updating the video processing tool configuration information to indicate the second combination.

20. One or more computer-readable memory or storage devices storing computer-executable instructions that do not constitute a signal,
which when executed cause a computer to perform a method, the method comprising:
identifying a plurality of media processing tools, the plurality of media processing tools comprising plural alternative media decoder implementations for a first media format, plural alternative media conversion processor implementations, and/or plural alternative media encoder implementations for a second media format;

measuring a first performance time of a first combination of one or more of the plurality of media processing tools for a first transcoding path;

measuring a second performance time of a second combination of one or more of the plurality of media processing tools for a second transcoding path different than the first transcoding path;

determining a variance by calculating a difference between the first and second performance times;

comparing the variance between the first and second performance times to a threshold variance;

based at least in part on the comparing, setting media processing tool configuration information identifying the first combination, wherein the setting of media processing tool configuration information comprises selecting one of the first combination or the second combination based on the determined variance;

accessing the media processing tool configuration information; and based at least in part on the media processing tool configuration information, processing high-resolution media data using the first combination, wherein the processing comprises transcoding the high definition media data from a first media format into a second media format.

21. The method of claim 1, wherein:

the plurality of video processing tools comprises a plurality of video encoders and a plurality of video decoders;

the first combination comprises at least a first one of the plurality of video encoders and/or at least a first one of the plurality of video decoders; and the second combination comprises at least a second one of the plurality of video encoders and/or at least a second one of the plurality of video decoders, the first one being different than the second one.

22. The method of claim 1, wherein the first combination includes a first video decoder, a first video conversion processor and a first video encoder for the first transcoding path, and wherein the second combination includes a second video decoder different from the first video decoder, a second video conversion processor different than the first video conversion processor, and a second video encoder different from the first video encoder, for the second transcoding path.

* * * * *